G. F. MACHLET, Jr.
HEATING APPARATUS.
APPLICATION FILED JAN. 27, 1908.

1,068,065.

Patented July 22, 1913.
5 SHEETS—SHEET 1.

Fig. 1

WITNESSES:
Philip C. Osterman
Fritz W. Machlet

INVENTOR
George F. Machlet Jr.
BY
B. C. Stickney
ATTORNEY G. F. MACHLET, Jr.
HEATING APPARATUS.
APPLICATION FILED JAN. 27, 1908.

1,068,065.

Patented July 22, 1913.
5 SHEETS—SHEET 3.

WITNESSES:
Philip C. Osterman
Fritz W. Machlet

INVENTOR
George F. Machlet Jr
BY
B. C. Stickney
ATTORNEY

UNITED STATES PATENT OFFICE.

GEORGE F. MACHLET, JR., OF ELIZABETH, NEW JERSEY.

HEATING APPARATUS.

1,068,065.

Specification of Letters Patent. Patented July 22, 1913.

Application filed January 27, 1908. Serial No. 412,829.

*To all whom it may concern:*

Be it known that I, GEORGE F. MACHLET, Jr., a citizen of the United States, residing in Elizabeth, in the county of Union and State of New Jersey, have invented certain new and useful Improvements in Heating Apparatus, of which the following is a specification.

This invention relates to furnace-regulating devices of the general class disclosed in my pending application No. 328,697, filed Aug. 1, 1906, in which is shown a galvanometer or voltmeter whose needle is operated by the heat of the furnace, and an open electrical circuit closable by the needle and having means to regulate the supply of fuel to the furnace.

One object of my present invention is to increase the accuracy and reliability of the furnace-regulating apparatus.

Another object is to enable the heat of the furnace to be maintained in close proximity to the desired point, that is, to avoid the substantial fluctuations in the heat.

Another object is to enable the heat of the furnace to be ascertainable at all times by the aid of the galvanometer needle, so that the usefulness of the latter for this purpose is not substantially impaired by its employment as a fuel-supply regulator.

The needle of a galvanometer or voltmeter is very light and delicately balanced and impelled by a very feeble force. Hence when the needle is employed to close a furnace-regulating circuit, the difficulty is met that too great a needle-impelling force is required to effect enough pressure upon the contact to permit the desired strength of electric current to flow through the furnace-regulating circuit. It is therefore liable to happen that the furnace-regulating apparatus will not operate until the heat of the furnace has far exceeded the point at which it is desired to reduce the fuel supply.

According to my present invention, a mere touch of the galvanometer-needle is caused to bring into action a self-moving device, which operates a fuel-controlling valve, and which moreover separates the contact from the needle, leaving the latter free to move either up or down to indicate further changes in the heat of the furnace. I provide a leading electrical circuit closable by said needle, and operating a circuit-closer in a main electrical circuit. Said circuit closer, it will be understood, is operable by a feeble current passing through the leading circuit; and the main circuit includes means for operating a fuel controlling valve.

The parts are constructed so that a bare touch of the needle against the contact in the leading circuit permits sufficient flow of electricity therethrough to operate the aforementioned circuit-closer in the main circuit. Hence the alteration in the supply of fuel to the furnace takes place when the needle reaches the point corresponding with the degree of heat which it is desired to maintain in the furnace. It is rendered unnecessary to effect a strong needle-pressure to close a circuit, and hence there is no waiting for enough excess of heat in the furnace to effect such pressure, before the supply of fuel is reduced. Preferably the needle itself does not form a part of said leading circuit, and no part of said circuit is carried upon said needle, so that there may not be any ill effects due to the flow of a current along the needle, tending to affect the galvanometer-circuit and thereby impair the accuracy of the needle. I pivot or swivel upon the needle a circuit-closer, whose ends are carried by the needle into engagement with two contacts in said leading circuit, thereby bridging said contacts and permitting a current to flow through a circuit. I also provide means whereby said self-moving device forcibly separates the contacts from the bridge or needle, and swings the contacts out of the path of the bridge, so that the needle is still available for reading the heat of the furnace; and if by accident the heat of the furnace should increase beyond the desired point, that fact will be apparent to the attendant. I also provide another pair of contacts to be engaged by the bridge at the recession of the needle as the furnace begins to cool, and arrange for said bridge to close a circuit through said contacts, to renew the supply of fuel to the furnace. These contacts also are automatically forced to separate from the bridge and to swing out of the path thereof, so that in case the heat of the furnace should accidentally diminish below the desired point, that fact will be apparent to the attendant. By causing the needle to engage these contacts during its fluctuations, the heat of the furnace may be maintained within narrow predetermined limits. I also provide means whereby the furnace-regulating apparatus may operate at any desired points along the range of travel of the needle.

In the specific form of the invention herein disclosed, the two leading circuits are in the form of shunts around a circuit-closer in the main circuit, and suitable armature mechanism is provided for enabling one of the leading circuits to call into action one magnet and the other leading circuit to call into action another magnet, to effect reciprocations of the armature; and the latter operates means to withdraw the contacts from the needle and to operate a valve which controls the fuel supply. In practice the contacts are forced away from the needle at the moment that the circuit is completed thereby, but means are provided to continue the movements of the armature and of the other mechanisms after such breaking of the circuit.

Other features and advantages will hereinafter appear.

In the accompanying drawings, Fig. 3 is a plan of the heat-controlling devices similar to Fig. 1, but showing the moving parts in midway position. Fig. 4 is a longitudinal section taken through a relief valve which controls a valve seen at Fig. 1, that regulates the supply of fuel to the furnace. Figs. 5 and 6 are cross-sections of the relief valve; Fig. 5 showing the valve closed, and Fig. 6 showing it opened. Fig. 7 is a perspective view of the galvanometer needle and bridge swiveled thereon. Fig. 8 is a sectional side elevation of devices seen at Fig. 3. Fig. 9 is a diagram of electrical heat-controlling circuits. Fig. 10 is a sectional side elevation of the electrical heat-controlling devices. Fig. 11 is a diagram to illustrate the relation of electric circuits which effect one alternation in the heat of the furnace. Fig. 12 is a diagram of the electric circuits which effect the other alternation in the heat of the furnace; Figs. 11 and 12 being carved out from the circuit seen at Fig. 9.

A furnace is indicated at 1 having burners 2 for mixed fuel and air, the fuel usually consisting of gas. A gas supply pipe is indicated at 3, and an air supply pipe at 4.

Figure 1:
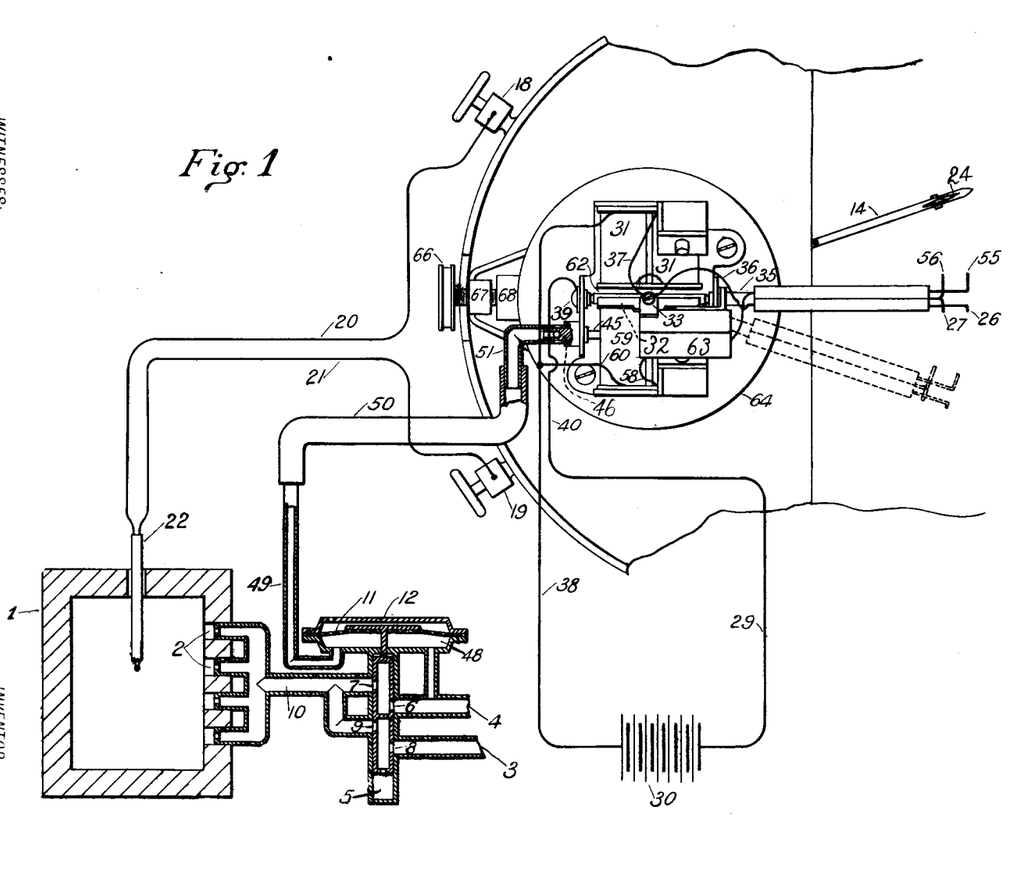
Figure 1 is a diagrammatic plan of a furnace and heat-regulating apparatus embodying my improvements, and showing the moving parts in one extreme position.
Figure 2:
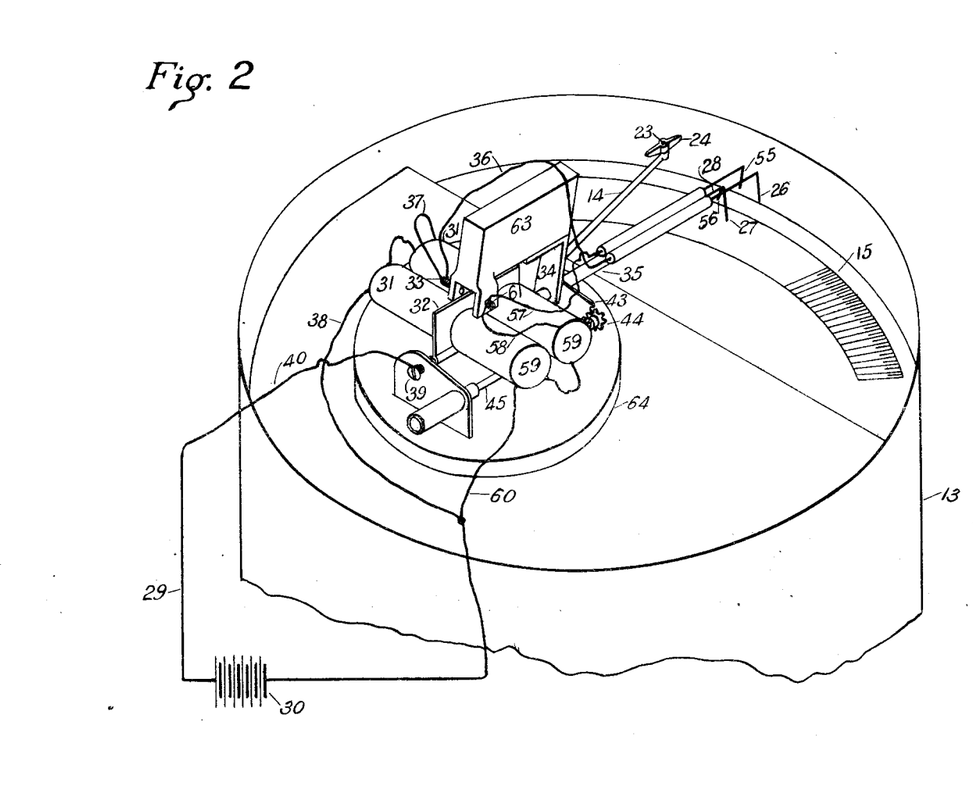
Fig. 2 is a perspective diagrammatic view of the principal portion of the heat-controlling devices.

A hollow cylindrical valve 5 has in its sides air ports 6, 7, and gas ports 8, 9, and is movable vertically to open or close said ports; the structure being substantially the same as shown in my said pending application. Gas and air passing through said ports are mixed in proper proportion in a pipe 10, which communicates with the burners 2. The fuel-controlling valve 5 is connected to a diaphragm 11 mounted in a head 12, and controlled by the heat of the furnace in a manner now to be described. The lifting of the diaphragm opens the ports as seen at Fig. 1, thereby admitting more fuel and gas into the furnace to heat it. The dropping of the valve either reduces or cuts off the fuel supply, and causes the furnace to cool.

A voltmeter or galvanometer 13 of a well known type is illustrated in communication with the furnace and having a needle 14 to indicate the heat of the furnace by means of a scale 15. The needle is pivoted at 16, being connected to a coil 17, the latter connected by binding posts 18, 19 and wires 20, 21 with an element 22 inserted in the furnace, so that heat of the furnace may cause a current to traverse the coil 17 and vibrate the latter together with the needle, to an extent dependent upon the heat of the furnace.

Figures 3, 4, 5, 6, 7, 8:
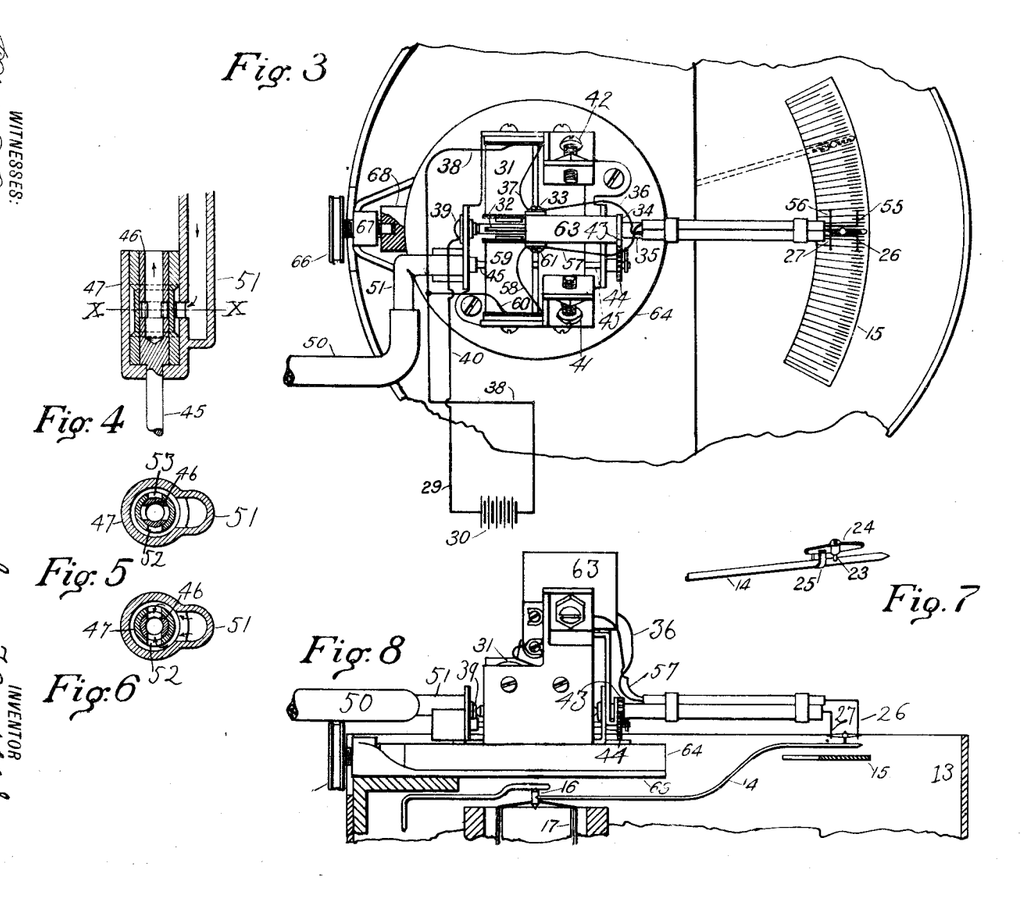
Figures 9, 10, 11, 12:
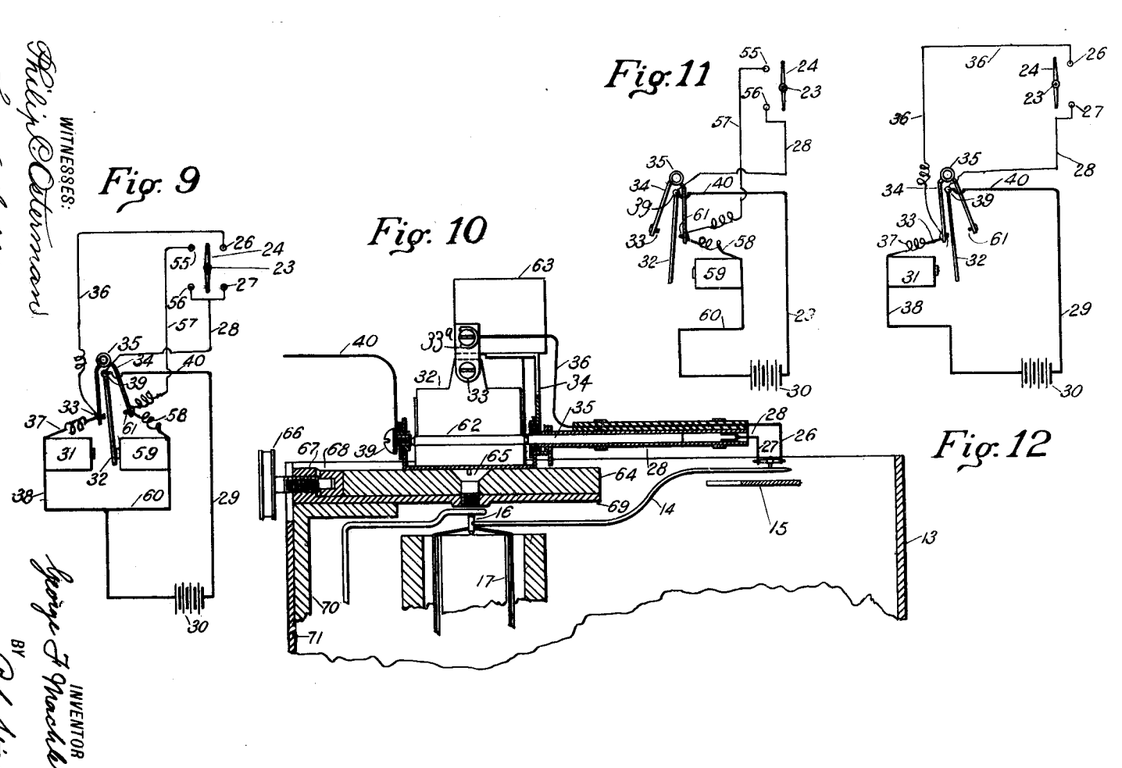
Figure 13:
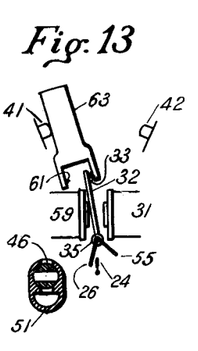
Figs. 13 to 17 are diagrammatic rear elevations to illustrate the successive stages in effecting a reduction in the supply of fuel to the furnace.
Figure 14:
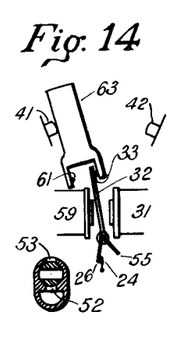
Figure 15:
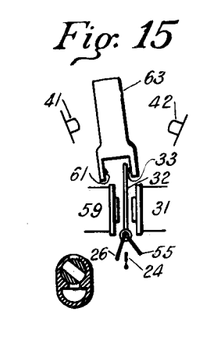
Figure 16:
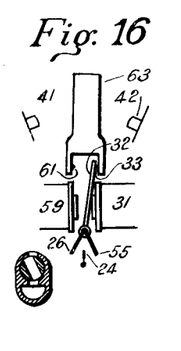

Upon the needle is swiveled at 23 a metal bridge 24, whose movements are limited by the arms of a U-piece 25 secured upon the needle, Fig. 7. In the path of the bridge are two contacts 26, 27, which are engaged by the ends of the bridge, whereby a shunt circuit through conductor 28 is closed, and the current is caused to pass through such shunt circuit and a main circuit through conductor 29, Fig. 9, the latter including a battery or other source of electromotive force 30, and a magnet 31. An armature 32 is attracted by the magnet and caused to close the main circuit which for convenience will now be designated as 29. It will be understood that owing to the feeble pressure of the needle or of the bridge against the contacts, the current which thereupon passes through the shunt and main circuits is very feeble; but it is sufficient to cause the armature 32 to move from the Fig. 13 to the Fig. 14 position, to close the main circuit, and thereby cause a powerful current to traverse the magnet 31. The only difference between Fig. 13 and Fig. 14, is that the main circuit has been closed, the armature 32 itself constituting the switch and engaging a point 33 upon a rocking arm 34, which is fixed upon a horizontal rock shaft 35. The shunt circuit which for convenience will now be designated as 28, includes a wire 36 which extends from the contact 26 to the point 33, that is to say, said point is formed upon a screw to which said wire is attached, the screw being threaded into the arm 34. From said screw, the wire 36 leads at 37 to the magnet 31 (or preferably to a pair of connected magnets as shown); and the magnet is connected by a wire 38 to the battery 30; and from the battery the wire 29 leads to a screw 39, which forms a pivot of the circuit closing armature 32, the latter completing the main circuit, which is shown in heavy lines at Fig. 12, the shunt circuit (through which only a feeble current passes) being shown in light lines. It will now be understood that when the bridge 24 closes the gap between the contacts or terminals 26, 27, a feeble current passes through 36, 37, 31, 38, 29, 28, whereby the magnet 31 is enabled to draw armature 32 against the point 33, thereby closing the main circuit and permitting a powerful current to pass through 37, 31, 38, 29, 40, 32 and 33, whereby the armature 32 is given a strong pull. The shunt circuit may be regarded as a leading circuit to call into action the main circuit, whereby the remainder of the work is done.

The magnet (or pair of magnets) 31 being powerfully energized, the armature 32 is enabled to pull the arm 34 over from the adjustable stop 41 to the adjustable stop 42. This arm 34 is mounted upon the rock shaft 35, which carries the contacts 26, 27, and as the armature 32 pulls the arm over, the shaft is rocked and said contacts are forcibly separated from the bridge 24 carried on the needle 14, and are rocked upwardly out of the path of the needle and bridge, so that the needle may continue to perform its function of indicating the heat of the furnace; and if the latter should accidentally become overheated, the needle would indicate that fact to the attendant, it not being permanently arrested by the contacts 26, 27. Such arrest in fact is only momentary, because a mere touch of the bridge against the contacts permits enough current to flow through the wires to cause the main circuit to close; and hence the indicating function of the needle is practically uninterrupted. Moreover, the tendency of the bridge to stick to the contacts, due to the passage of the current therethrough, is overcome by the forcible separation of the contacts from the bridge; so that liability of erratic indication by the needle is avoided. Although the shunt or leading circuit is broken by such separation of the contacts, it will be understood that the main circuit remains closed, since the magnet 31 continues to draw the armature 32 forcibly against the screw point 33, so that the arm 34 continues to swing, and this movement continues until the arm is arrested by the stop 42, Fig. 17. It will be seen that the armature 32 switches the current from one circuit to the other.

A sector 43 on the rock shaft 35 meshes with a pinion 44 on a rock shaft 45, which carries at its end a relief valve 46 in a pipe 47. This valve remains closed during the heating of the furnace and until the shaft 35 has been rocked in the described manner; and during such rocking the shaft 45 turns, so that the valve rotates from the position at Fig. 23 to the position at Fig. 17, thereby opening a communication or vent between the diaphragm chamber 48 and the atmosphere, so that the diaphragm settles and the valve 5 drops, thereby reducing or cutting off the supply of fuel to the furnace. It will be seen that a vent pipe 49 leads from said chamber 48, and is connected by a flexible pipe 50 to an elbow 51, the latter having apertures 52, 53 which are closed, Figs. 13 and 14, by means of the valve 46, whereby the pressure of air in the chamber 48 is maintained, and the valve 5 held up, Fig. 1. When said valve 46 is rotated to the position at Fig. 17, a perforation 54 therein establishes a communication beween the openings 52 and 53, so that air is exhausted from the elbow 51, connection 50, pipe 49 and chamber 48, with the described result of cutting off fuel and reducing the heat of the furnace. The main electrical circuit 29 may therefore be regarded as an automobile device, which is called into action by a mere temporary closing of the shunt circuit, and continues to act after the shunt circuit is broken, to perform the recited operations. The reduction in the supply of fuel permits the furnace to cool, and the needle 14 consequently begins to recede. Before this movement proceeds very far, however, the bridge 24 engages a pair of contacts 55, 56, which are mounted upon said rock shaft 35, and by the described turning movement of the latter were rocked into the path of the bridge. By this means, a shunt or leading circuit 28, 57 is closed, and a feeble current is caused to flow through wires 29, 28, 57, 58, a magnet 59 and a wire 60 back to the battery 30. This current, although very feeble, is sufficient to pull the armature 32, (which is pivoted to vibrate between the magnets 31, 59) over against a screw point 61 upon the arm 34, thereby closing the main circuit 29, 40, 58, 59, (32) 60, and causing a powerful current to flow through said main circuit, with opposite results from those heretofore described, the armature 32 being caused to pull the arm 34 back to the position at Fig. 13, and the rock shaft 35 consequently turning back to throw the contacts 55, 56 away from the bridge, and up out of the path thereof, and to restore the contacts 26, 27 to their initial positions; while the relief valve 46 is turned from its open position at Fig. 17 to its closed position at Fig. 13, thereby cutting off escape of air from the diaphragm chamber 48, so that the diaphragm is again raised by air pressure to the position at Fig. 1, and the supply of fuel to the furnace increases accordingly.

It will be seen that the furnace cannot cool unduly without that fact being apparent to the attendant, because owing to the upward movement of the contacts 55, 56, there is nothing to prevent the needle 14 from receding past the same.

The armature 32 is seen working upon a shaft 62 (Figs. 1 and 10), having at one end a support 39 and a suitable support at the other end; said shaft 62 being, however, movable independently of the rock shaft 35. It will be understood that different parts of the circuits are suitably insulated.

Figure 17:
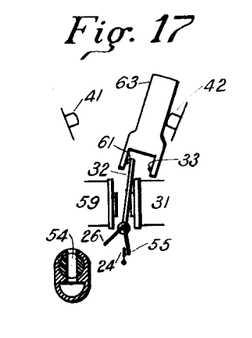
Figure 18:
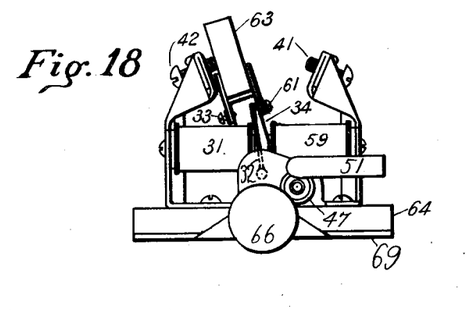
Fig. 18 is a front elevation of the electrical devices, and Fig. 19 a rear elevation thereof, the positions of the parts corresponding with Fig. 17.
Figure 19:
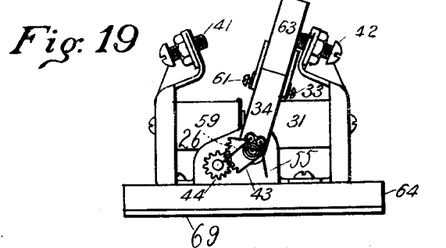

The stroke of the armature 32 is much shorter than that of the arm 34, the armature being arrested at each end of its stroke by engagement with the end of the magnet, and the arm moving thereafter to bring the point 33 or 61 into proximity to the armature (Figs. 13 and 17). The arm 34 has a weight 63 to cause it to continue in motion after the arrest of the armature 32.

The magnets and associated mechanism are mounted upon a disk-like plate or table 64 adjustable about a pivot screw 65, (Fig. 10,) said screw being about concentric with the axis of rotation of the needle 14, whereby the table and the parts thereon including the rock shaft 35, and the four contacts on its outer end may be adjusted to any desired point relatively to the scale 15. Thus when it is desired to bring the heat of the furnace to any desired degree, it is only necessary to turn the table 64 until the rock shaft points to the desired degree on the scale 15, or until the contacts 26, 27 stand over the desired mark on said scale, whereupon the heat of the furnace will increase to the desired degree and remain approximately at that heat as long as required. The table 64 may be shifted either up or down to increase or diminish the heat of the furnace from time to time, and it may be held where adjusted by means of a thumb screw 66, threaded into a boss 67 on the frame of the voltmeter, and pressing a friction block 68 against the edge of the table 64. The latter rests upon a horizontal plate 69 secured by a bracket 70 within the casing 71 of the voltmeter.

The term "furnace" where used in the claims is intended to include heating apparatus generally; or in other words the invention is intended in its main features to be used to control heat. The invention is applicable to an apparatus in which other devices than the element 22 are employed for affecting the needle of the galvanometer. Where the claims refer to fuel-regulating or controlling device, I mean to include generally all devices which are usually employed for controlling the heat of the apparatus which is to be provided with my invention.

Variations may be resorted to within the scope of the invention, and portions of the improvements may be used without others.

Having thus described my invention, I claim:

1. The combination of a furnace, a shiftable furnace-regulating device, an element in said furnace, a galvanometer connected to said element, an electrical circuit having a part in the path of the needle of the galvanometer to enable said circuit to be closed by a mere touch between said needle and said part, means being provided to permit said needle to move past said part after closing said circuit, said circuit also including a part movable by a feeble current passing through the circuit, and relatively powerful means called into action by said movable part to shift said furnace regulating device.

2. The combination with a furnace, of an electrical device connected thereto and including an index or part movable by a weak current produced by the heat of the furnace, an electrical leading circuit, means, including a contact, for enabling said movable part by exerting a weak pressure to close said leading circuit, means being provided for permitting the index to continue its movement past said contact in the same direction after closing said leading circuit, and means for enabling a feeble current flowing through said leading circuit to cause a strong current to flow through a main electrical circuit, a device being included in the main circuit and shiftable by the current in said main circuit, to regulate the heat of the furnace.

3. The combination with a furnace and shiftable means to regulate the heat thereof, included in a main electrical circuit requiring a strong current to shift the heat-regulating means, of an electrical device through which a weak current is caused to flow by the heat of the furnace and including an index or part which is moved by the current from initial position to an extent determined by the strength or volume of the current, and an electrical leading circuit having a contact and normally open but closable by a feeble touch or pressure of said index or movable part sufficiently to permit a feeble current to pass through said leading circuit, means being provided for permitting the index to continue its movement in the same direction past said contact after closing said leading circuit, and means for enabling such feeble current passing through said leading circuit to cause to flow through the main circuit a current sufficiently strong to shift said heat-regulating means.

4. The combination of a galvanometer having a needle or part movable by an electrical current, and a regulating device controlled by said movable part, said regulating device comprising two members, either of which may coöperate with said movable part to effect the desired regulation; means being provided to cause the active member to move out of position to coöperate with said needle and the other member to move into position to coöperate with said needle upon the opposite stroke of the latter; said needle being movable past one of said members.

5. The combination of an open electrical circuit including a device shiftable by the current in the circuit for regulating the heat of a furnace, a galvanometer controlled by an element in the furnace, and including a movable finger, and an electrical leading circuit including a contact and closable by a mere touch of said finger and caused thereby to close the first circuit; means being provided for permitting said finger to continue its movement in the same direction past said contact after closing said leading circuit.

6. A furnace-regulator comprising a normally open electrical circuit including an electro-magnet and a circuit-closer operable by said magnet, said circuit having means to control the heat of the furnace, a galvanometer device operated by the heat of the furnace, and a normally open shunt circuit connected to said circuit around said closer, and closable by said galvanometer device.

7. A furnace-regulator comprising a normally open electrical circuit including an electro-magnet and means operable thereby to control the heat of the furnace, a galvanometer device operated by the heat of the furnace, and also including a circuit-closer operable by said magnet, and a normally open shunt circuit connected to said circuit around said closer, and closable by said galvanometer device.

8. A furnace regulating apparatus comprising a normally open electrical circuit including an electro-magnet having an armature and also including a circuit-closer operable by said armature, a furnace-regulating device actuable by said armature after the latter closes the circuit, a normally open shunt circuit connected to said circuit around said closer, a galvanometer device operated by the heat of the furnace, and a circuit-closer for the shunt circuit carried by the needle of said galvanometer.

9. A furnace-regulating apparatus comprising a normally open electrical circuit including an electro-magnet having a circuit-closing armature, and also including a contact device coöperating with the armature to close the circuit, means operable by said armature through its actuation of said contact device for regulating the heat of the furnace, a normally open shunt circuit connected to said circuit around said circuit-closing devices, a galvanometer device operated by the heat of the furnace, and a circuit-closer for the shunt circuit carried by the needle of said galvanometer.

10. The combination of a furnace, a furnace-regulating device, a galvanometer connected to the furnace and including a part moving to and fro in keeping with variations in the heat of the furnace, electrical circuits independent of said moving part but closable in alternation by opposite movements of said moving part, said circuits including a member common to both circuits and vibratable in alternate directions by feeble currents passing through the circuits, and relatively powerful means called into action by said vibratable member to move said furnace-regulating device in alternate directions.

11. A furnace regulator comprising normally open electrical circuits, each including an electro-magnet, a circuit-closer reciprocatable by said magnets, said circuit-closer having means to regulate the heat of the furnace, and normally open shunt-circuits connected to the main circuits around said closer, said shunt-circuits closable in alternation by a galvanometer operated by the heat of the furnace.

12. A furnace regulator comprising normally open electrical circuits, each including an electro-magnet, means operable by said magnets to control the heat of the furnace, each circuit also including a circuit-closer operable by the magnets, and normally open shunt-circuits connected to the main circuits around said closer and closable in alternation by a galvanometer device operated by the heat of the furnace.

13. A furnace regulating apparatus comprising normally open main electrical circuits, each including an electro-magnet, an armature, and a circuit-closer operable by said armature, a furnace-regulating device reciprocatable by said armature after the latter closes either main circuit, normally open shunt-circuits connected to the main circuits around said closer, and a circuit-closer for the shunt-circuits carried by the needle of a galvanometer operated by the heat of the furnace.

14. A furnace regulating apparatus comprising normally open electrical circuits, each including an electromagnet, a circuit-closing armature, contact devices coöperating with the armature to close the main circuits in alternation, means operable by said armature through its actuation of said contact devices for regulating the heat of the furnace, normally open shunt-circuits connected to said main circuits around said armature, and a circuit closer for the shunt-circuits carried by the needle of a galvanometer operated by the heat of the furnace.

15. The combination of a galvanometer, having a needle or part, and also having electrically operating means to move said needle, a member movable into position to coöperate with said needle, a regulating device controlled by said member, and means to cause said member upon moving said regulating device to move itself out of position to engage said needle; said needle being movable by said electrically operated means past said member.

16. The combination of a galvanometer, having a needle or part, and also having electrically operating means to move said needle, a member movable into position to coöperate with said needle, a regulating device controlled by said member, means to cause said member upon moving said regulating device to move itself out of position to engage said needle; said needle being movable by said electrically operated means past said member, and means to effect adjustment of said member along the path of said needle.

17. The combination of open main electrical circuits having a source of power, adjacent magnets one in each circuit, an armature mounted between said magnets and included in both of said circuits, an open shunt circuit around said armature in each of said main circuits, means for enabling fluctuations in the heat of a furnace to close said shunt circuits in alternation, means for enabling the armature to close the main circuits in alternation, and means for enabling the armature, after closing either main circuit, to operate a furnace-regulating device.

18. The combination of open main electrical circuits having a source of power, adjacent magnets one in each circuit, an armature mounted between said magnets, and included in both of said circuits, an open shunt circuit around said armature in each of said main circuits, means for enabling fluctuations in the heat of a furnace to close said shunt circuits in alternation, means for enabling the armature to close the main circuits in alternation, and means for enabling the armature, after closing either main circuit, to operate a furnace-regulating device; and means for thereupon causing the main circuit to break at the armature.

19. The combination of open main electrical circuits having a source of power, adjacent magnets one in each circuit, an armature mounted between said magnets and included in both of said circuits, an open shunt circuit around said armature in each of said main circuits, means for enabling fluctuations in the heat of a furnace to close said shunt circuits in alternation, means for enabling the armature to close the main circuits in alternation, and means for enabling the armature, after closing either main circuit, to operate a furnace-regulating device; and means to cause the shunt and main circuits to break upon the operation of the armature.

20. The combination of open main electrical circuits having a source of power, adjacent magnets one in each circuit, an armature mounted between said magnets and included in both of said circuits, an open shunt circuit around said armature in each of said main circuits, means for enabling fluctuations in the heat of a furnace to close said shunt circuits in alternation, an arm or carrier having separate contacts included in said main circuits, said contacts engageable by said armature to enable the latter both to force the carrier in alternate directions and to close the main circuits in alternation, stops to limit the vibrations of the armature, means for prolonging each movement of the carrier after arrest of the armature, to break the main circuit, and a furnace-regulating device operated by the carrier.

21. The combination of two magnets, an armature mounted between said magnets, means for enabling slight fluctuations in the heat of a furnace to energize feebly said magnets in alternation, an arm in the path of said armature and having contacts to enable the initial portion of the stroke of the armature in either direction to close a primary circuit through the active magnet, to cause the latter to throw both the armature and the arm, means for limiting the strokes of the armature, means for prolonging the stroke of the arm to disconnect it from the armature, and means controlled by the arm for regulating the heat of the furnace.

22. The combination with a furnace, of a galvanometer operated by the heat of the furnace and including a movable finger, normally open leading electrical circuits closable in alternation by said finger, normally open main circuits having a source of power and each including a magnet, a single arm having two contacts one in each of said main circuits, and a single armature included in said main circuits and constructed to move into engagement with the arm contacts to close the main circuits in alternation and reciprocate said arm, and furnace-regulating devices controlled by said arm.

23. The combination with a furnace, of a galvanometer operated by the heat of the furnace and including a movable finger, normally open leading electrical circuits closable in alternation by said finger, normally open main circuits having a source of power and each including a magnet, an arm having contacts one in each of said main circuits, and an armature included in said main circuits, and constructed to move into engagement with the arm contacts to close the main circuits in alternation and reciprocate said arm, and furnace-regulating devices controlled by said arm; means being provided to throw said arm in each direction beyond the point to which it is carried by said armature.

24. The combination with a furnace, of a galvanometer operated by the heat of the furnace and including a movable finger, a rock-shaft having contacts in the path of said movable finger, normally open leading electrical circuits closable in alternation by the engagement of said finger with said contacts, normally open main circuits having a source of power, and each including a magnet, a weighted tilting arm mounted upon said rock shaft and having contacts one in each of said main circuits, an armature included in said main circuits and constructed to engage said arm contacts and thereby both close said main circuits in alternation and vibrate said arm, and furnace-regulating devices controlled by said arm.

25. The combination with a furnace, of a galvanometer operated by the heat of the furnace and including a movable finger, a rock shaft having contacts in the path of said movable finger, normally open leading electrical circuits closable in alternation by the engagement of said finger with said contacts, normally open main circuits having a source of power, and each including a magnet, a weighted tilting arm mounted upon said rock shaft and having contacts one in each of said main circuits, an armature included in said main circuits and constructed to engage said arm contacts and thereby both close said main circuits in alternation and vibrate said arm, and furnace-regulating devices controlled by said arm; means being provided to limit the movements of said armature; and stops to arrest said arm after its weight tilts it out of engagement with said armature.

26. The combination with a furnace, of a galvanometer operated by the heat of the furnace and including a movable finger, a rock shaft having contacts in the path of said movable finger, normally open leading electrical circuits closable in alternation by the engagement of said finger with said contacts, normally open main circuits having a source of power, and each including a magnet, a weighted tilting arm mounted upon said rock shaft and having contacts one in each of said main circuits, an armature included in said main circuits and constructed to engage said arm contacts and thereby both close said main circuits in alternation and vibrate said arm, and furnace-regulating devices controlled by said arm; the movement of said rock shaft effected by said arm being sufficient to move one contact out of the path and the other into the path of said finger.

27. The combination of a furnace, a shiftable furnace-regulating device, an element in said furnace, a galvanometer connected to said element, an electrical circuit having a part in the path of the needle of the galvanometer to enable said circuit to be closed by a mere touch between said needle and said part, said circuit excluding said needle but including a part movable by a current passing through the circuit, and prime-moving means called into action by said movable part to shift said furnace-regulating device.

28. The combination with a furnace, of an electrical device connected thereto and including an index or part movable by the current produced by the heat of the furnace, an open electrical leading circuit, having contacts, a bridge swiveled upon said movable part to engage said contacts to close said leading circuit, and means for enabling a feeble current flowing through said leading circuit to cause a strong current to flow through a main electrical circuit, shiftable mechanism being included in the main circuit to regulate the heat of the furnace.

29. The combination with a furnace, of an electrical device connected thereto and including an index or part movable by the current produced by the heat of the furnace, an open electrical leading circuit, having contacts, a bridge swiveled between its ends upon said movable part to enable said ends to engage said contacts to close said leading circuit, and means for enabling a feeble current flowing through said leading circuit to cause a strong current to flow through a main electrical circuit, shiftable mechanism being included in the main circuit to regulate the heat of the furnace.

30. The combination with a furnace, of an electrical device connected thereto and including an index or part movable by the current produced by the heat of the furnace, an open electrical leading circuit having contacts, a bridge swiveled between its ends upon said movable part to enable said ends to engage said contacts to close said leading circuit, and means for enabling a feeble current flowing through said leading circuit to cause a strong current to flow through a main electrical circuit, a shiftable device being included in the main circuit to regulate the heat of the furnace; means being provided upon said index to limit the play of the bridge swiveled thereon.

31. A furnace-regulator comprising a normally open electrical circuit including an electro-magnet and a circuit-closer operable by said magnet, said circuit having means to operate a shiftable device to control the heat of the furnace, and a normally open shunt-circuit connected to said circuit around said closer, and closable by a galvanometer finger moved by the heat of the furnace; said shunt circuit being formed and mounted independently of said finger.

32. The combination with a furnace, of an element therein, a galvanometer connected to said element and including an index or part movable by the current, a bridge swiveled between its ends upon said index, normally open electrical leading circuits closable in alternation by said bridge, and a main electrical circuit controllable by either of the first circuits and including shiftable means to alternately increase and diminish the heat of the furnace.

33. The combination with a furnace, of an electrical device connected thereto and including an index or part movable by a current produced by the heat of the furnace, normally open electrical leading circuits, and pivoted switching means operable by said movable part to close said circuits in alternation, each circuit including means operable by a feeble current for causing a strong current to flow through a main electrical circuit which includes a device shiftable to increase or diminish the heat of the furnace according to the leading circuit operated.

34. A furnace regulating apparatus comprising normally open main electrical circuits, each including an electro-magnet, an armature, and a circuit-closer operable by said armature, a furnace-regulating device reciprocatable by said armature after the latter closes either main circuit, normally open shunt-circuits connected to the main circuits around said closer, and a circuit-closer for the shunt-circuits swiveled between its ends upon a needle of a galvanometer operated by the heat of the furnace.

35. A furnace-regulating apparatus comprising a galvanometer needle movable by the heat of the furnace, and an open electrical circuit having a contact in the path of said needle, whereby the latter may close the circuit, and including means to move said contact out of the plane of the needle's movement, to permit the needle to move past the contact, and also including means to regulate the heat of the furnace.

36. A furnace regulating apparatus comprising a galvanometer needle movable by the heat of the furnace, and an electrical apparatus having four circuit-closing contacts arranged in pairs, one pair in the path of the needle, the other pair out of said path, and including means to move the first pair of contacts out of the path of the needle and the other pair of contacts into the path thereof, and also including means to regulate the heat of the furnace.

37. A furnace regulating apparatus comprising a galvanometer needle movable by the heat of the furnace, a bridge swiveled on said needle, and an open electrical circuit having a pair of contacts in the path of said bridge, whereby the circuit may be closed, and including means to move said contacts away from the bridge, and also including means to regulate the heat of the furnace.

38. A regulating apparatus comprising a galvanometer needle, a bridge swiveled on said needle, an electrical furnace-regulating device having two pairs of contacts, each movable into and out of the path of said bridge, whereby the needle may close a circuit through either pair of contacts, and including means to move the live pair of contacts away from said bridge and the other pair into the path of the bridge.

39. A regulating apparatus comprising a galvanometer-needle, and an electrical device having regulating means, and including circuit closing means and also including means to present said circuit-closing means to the needle upon both the advancing and receding movements thereof, to cause the operation of said regulating means, without interfering with the continued advance or recession of the needle in the same direction, so that the needle is left free for additional advance or recession immediately upon closing the circuit.

40. A regulating apparatus comprising a galvanometer-needle, and an electrical device having regulating means, and including circuit closing means and also including means to present said circuit-closing means to the needle upon both the advancing and receding movements thereof, to cause the operation of said regulating means, without interfering with the continued advance or recession of the needle in the same direction, so that the needle is left free for additional advance or recession immediately upon closing the circuit; said circuit-closing means being rotatably mounted and being actuated by said electrical device upon the closing of the circuit.

41. A furnace-regulating apparatus comprising a galvanometer needle movable by the heat of the furnace, a bridge swiveled upon said needle, and an electrical device having means to regulate the heat of the furnace and including means to present a pair of circuit-closing contacts to the bridge upon both the advancing and receding movements of the needle, to cause the operation of said regulating means, without interfering with continued advance or recession of the needle in the same direction, so that the needle is left free for additional advance or recession immediately upon closing the circuit.

42. A furnace-regulating apparatus comprising a galvanometer needle movable by the heat of the furnace, a bridge swiveled upon said needle, and an electrical device having means to regulate the heat of the furnace and including means to present a pair of circuit-closing contacts to the bridge upon both the advancing and receding movements of the needle, to cause the operation of said regulating means, without interfering with continued advance or recession of the needle in the same direction, so that the needle is left free for additional advance or recession immediately upon closing the circuit; said circuit-closing contacts being mounted upon a rotatable shaft whose movements are effected by said electrical device upon the closing of the circuit.

43. A furnace-regulating apparatus comprising a needle, electrically operating means to render said needle movable by the heat of the furnace, an open electrical circuit having a contact in the path of said needle, whereby the latter may close the circuit, and self-moving means controlled by said circuit for moving said contact out of the path of the needle to permit the needle to pass the contact, and for regulating the heat of the furnace; said needle being movable past said contact by said electrically operating means.

44. A regulating apparatus comprising a galvanometer needle, an electrical device having circuit-closing contacts engageable alternately by the needle during opposite movements thereof, self-moving means called into action by the closing of the circuit, for moving the live contact out of the path of the needle and the other contact into the path thereof, to permit the needle to pass one contact and engage the other, and simultaneously effecting a regulation.

45. A furnace-regulating apparatus comprising a galvanometer needle movable by the heat of the furnace, a circuit-closing bridge movable by said galvanometer needle, an open electrical circuit having a pair of contacts in the path of the bridge, whereby the circuit may be closed, and self-moving means called action by the closing of said circuit, to move said contacts away from the bridge and to regulate the heat of the furnace.

46. A furnace-regulating apparatus comprising a galvanometer needle movable by the heat of the furnace, a swiveled bridge or circuit-closer operated by said needle, a furnace regulating device controlled by circuits having two pairs of contacts each movable into and out of the path of the bridge, whereby the needle may close a circuit through either pair of contacts, and self-moving means controlled by said circuits to move the live pair of contacts away from said bridge, and the other pair of contacts into the path of said bridge.

47. A furnace-regulating apparatus comprising a needle, electrically operating means to render said needle movable by the heat of the furnace, an open electrical leading circuit having a contact in the path of said needle, whereby the latter may close the circuit, and a main electrical circuit controlled by said leading circuit and having means to move said contact out of the path of the needle, to permit the needle to pass the contact, and also having means to regulate the heat of the furnace; said needle being movable past said contact by said electrically operating means.

48. The combination of a galvanometer needle, and an electrical regulating device, including leading circuits having circuit-closing contacts engageable alternately by the needle during opposite movements thereof, and main electrical circuits controlled by said leading circuits and having means for moving the live contact out of the path of the needle and the other contact into the path thereof, to permit the needle to advance past the first contact and to engage the second contact upon the return stroke of the needle.

49. The combination of a galvanometer needle, a regulating device, a bridge movable by said galvanometer needle, an open electrical leading circuit having a pair of contacts in the path of the bridge, whereby the circuit may be closed, and a normally open electrical main circuit closable by said leading circuit, and having means to move said contacts away from the bridge, and to operate said regulating device.

50. The combination of a galvanometer needle, a regulating device, a swiveled bridge or circuit-closer operated by said needle, electrical leading circuits having two pairs of contacts each movable into and out of the path of the bridge, whereby the needle may close a circuit through either pair of contacts, and main electrical circuits controlled by said leading circuits and having means to move the live pair of contacts away from said bridge, and the other pair of contacts into the path of said bridge, and to reciprocate said regulating device.

51. The combination of a furnace, a mechanism operated by the furnace and including a part movable by an electrical current generated by the furnace heat, a device in the path of said movable part and operable thereby, means connected to said device to diminish the heat of the furnace, and a second device in the path of said movable part and operable by an opposite movement of the latter, and means connected to said second device to increase the heat of the furnace; said first and second devices connected to each other and manually adjustable simultaneously to determine by a single adjustment the heat at which the furnace shall be maintained.

52. In a regulating apparatus, the combination with a needle or moving part of a galvanometer or the like, of an electrical device for regulating the heat of the furnace and including an open circuit having a circuit-closing contact in the path of the needle, and means called into action by the closing of the circuit to move said contact out of the path of said needle to permit the needle to pass the contact, means being provided to complete such movement of the contact after the breaking of the circuit due to the separation of the contact from the needle.

53. In a regulating apparatus, the combination with a needle or moving part of a galvanometer or the like, of an electrical regulating device including an electrical circuit and circuit-closing contacts movable alternately out of the path of the needle, to permit the needle to pass by the same, and engageable alternately by the needle by reason of fluctuations of the latter, and means called into action by reason of the arrest of the needle by either contact, to move such contact out of the path of the needle and the other contact into the path of the needle; means being provided to complete such movement of the contacts after the breaking of the circuit due to the separation of the contact from the needle.

54. A regulating apparatus including a needle or movable part, electrically operable means for moving said needle, an electrical device including a circuit-closing contact in the path of the needle, and having means to regulate the furnace; and means controlled by said needle to cause said contact to move out of its path, to permit the needle to pass the contact; said needle being movable past said contact by said electrically operable means.

55. A furnace-regulating apparatus including a needle or movable part of a galvanometer or the like, and an electrical device including circuit-closing contacts engageable in alternation by the needle upon the advance and recession thereof; means being provided to enable said electrical device to cause either contact to move out of and the other contact to move into the path of the needle to permit said needle to pass said contacts in alternation, and means shiftable by said electrical device for regulating the heat of the furnace according to the fluctuations of the needle.

56. In a furnace-regulating apparatus, the combination with a galvanometer having a needle or movable part controlled by the heat of the furnace, of two devices movable alternately out of the path of said needle, to permit the needle to pass by said devices in alternation; and means for enabling a mere touch of the needle against either of said devices to cause the latter to move out of and the other device to move into the needle's path, and also to cause the heat of the furnace to alter in a manner to cause a movement of the needle to the last-mentioned device, whereby the heat of the furnace is maintained approximately uniform.

57. A regulating apparatus comprising a movable needle, a regulating electrical circuit normally open and having a circuit-closing contact in the path of the needle, means being also controlled by said circuit to effect forcible separation and relative displacement between the needle and the contact, and electrically operable means to move said needle past said contact.

58. A regulating apparatus comprising a movable needle, an electrical regulating device, and also including circuit-closing contacts engageable by the needle alternately upon successive fluctuations thereof; means being provided to effect relative displacement between the needle and one of said contacts; and electrically operable means to move said needle past said contact.

59. A furnace-regulating apparatus comprising a galvanometer needle controlled by the heat of the furnace, and an electrical device including means to regulate the heat of the furnace, and also including circuit-closing contacts engageable by the needle alternately upon successive fluctuations thereof; means being controlled by the electrical device for effecting forcible disengagement of the needle from either contact, and relative displacement between the needle and the disengaged contact, to permit the needle to pass the same.

60. A furnace-regulating apparatus comprising a mechanism operated by the furnace and including a part movable by an electrical current generated by the heat of the furnace, and opposite devices movable into and out of the path of said movable part to be first engaged and then passed by the latter, and caused alternately by the movable part during successive fluctuations thereof to move into and out of the path of said movable part, and connected to means to alternately increase and decrease the heat of the furnace, said devices adjustable to determine the heat at which the furnace shall be maintained.

61. A furnace-regulating apparatus including a needle or movable part, of a galvanometer or the like, and an electrical device including a circuit closing contact in the path of the needle, and having means to regulate the furnace, an adjustable mount being provided for said contact to enable it to be set at different points in the path of the needle, means being provided to enable the needle to cause said contact to move out of its path, to permit the needle to pass the contact.

62. A furnace-regulating apparatus including a needle or movable part of a galvanometer or the like, and an electrical device including circuit-closing contacts engageable alternately by the needle upon the advance and recession thereof; means being provided to cause the engaged contact to move out of and the other contact to move into the path of the needle; and means being included in said electrical device for regulating the heat of the furnace according to the fluctuations of the needle; said circuit closing contacts being adjustable to different points along the path of the needle to determine the degrees of heat at which the electrical device shall operate.

63. In a furnace-regulating apparatus, the combination with a galvanometer having a pivoted needle or movable part controlled by the heat of the furnace, of two devices movable alternately into the path of said needle, and means for enabling a mere touch of the needle against either of said devices to cause the latter to move out of and the other device to move into the needle's path, and also to cause the heat of the furnace to alter in a manner to cause a movement of the needle to the last-mentioned device, whereby the heat of the furnace is maintained approximately uniform; said devices being carried upon a mount which is pivoted to enable them to be set to different points in the path of the needle.

64. A furnace-regulating apparatus comprising a galvanometer needle controlled by the heat of the furnace, a furnace-regulating electrical circuit normally open and having a circuit-closing contact in the path of the needle, means being also controlled by said circuit to effect forcible separation and relative displacement between the needle and the contact, to permit the needle to pass by the contact, and adjustable means to predetermine the degree of heat at which the circuit shall be closed.

65. A furnace-regulating apparatus comprising a galvanometer needle controlled by the heat of the furnace, means to regulate the heat of the furnace, an electrical device controlling said regulating means, said electrical device including circuit-closing contacts engageable by the needle alternately upon successive fluctuations thereof; means being provided for enabling the needle to move past said contacts; and means being also provided for determining the degrees of heat at which the contacts shall be engaged by the needle.

66. A regulating apparatus comprising a galvanometer needle, and an electrical device controlling regulating means and including circuit-closing contacts engageable by the needle alternately upon successive fluctuations thereof; means being controlled by the circuit for effecting forcible disengagement of the needle from either contact; said contacts being carried upon a mount which is adjustable to set the contacts at different points along the path of the needle, and a scale being provided for the needle and contacts.

67. The combination of a galvanometer needle movable by the heat of the furnace, and an electrical device to regulate the heat of the furnace and including a circuit-closing bridge movable by said galvanometer needle, an open electrical leading circuit having a pair of contacts in the path of the bridge, whereby the circuit may be closed, a normally open electrical main circuit closable by said leading circuit, and having means to move said contacts away from the bridge, and a mount or support on which said contacts are mounted, whereby they may be set to different points in the path of the needle.

68. A furnace-regulating apparatus comprising a galvanometer needle movable by the heat of the furnace, a bridge swiveled upon said needle, and an electrical device having means to regulate the heat of the furnace and including a pair of circuit-closing contacts and means to present them to the bridge upon both the advancing and receding movements of the needle, and constructed to move to positions to permit continued advance or recession of the needle in the same direction, so that the needle is left free for additional advance or recession immediately upon closing the circuit; said circuit-closing contacts being mounted upon a rotatable shaft whose movements are effected by said electrical device upon the closing of the circuit; said rotatable shaft being carried upon a mount which is adjustable to set the contacts to different points in the path of the needle.

69. The combination with a furnace, of a galvanometer operated by the heat of the furnace and including a movable finger, a rockshaft having contacts in the path of said movable finger, normally open leading electrical circuits closable in alternation by the engagement of said finger with said contacts, normally open main circuits having a source of power, and each including a magnet, a weighted tilting arm mounted upon said rock shaft and having contacts one in each of said main circuits, an armature included in said main circuits and constructed to engage said arm contacts and thereby both close said main circuits in alternation and vibrate said arm, said leading circuits being in the form of shunts around said armature, and furnace-regulating devices controlled by said arm; the movement of said rock shaft effected by said arm being sufficient to move one contact out of the path and the other into the path of said finger; said rock-shaft, magnets and armature carried upon a mount which is adjustable to set said contacts to different points in the path of the movable finger.

70. A furnace-regulating apparatus including a galvanometer or voltmeter comprising a needle pivoted within a casing and operated by the heat of the furnace, a table or mount rotatably mounted on the casing and independently of the needle pivot, and an arm extending out from said mount and carrying contacts in the path of the needle; said contacts included in electrical circuits having means to regulate the heat of the furnace, and means being provided to effect relative displacement between the needle and one of said contacts, to enable the needle to pass the contact.

71. A furnace-regulating apparatus including a galvanometer or voltmeter comprising a needle pivoted within a casing and operated by the heat of the furnace, a table or mount rotatably mounted on the casing and independently of the needle pivot, and an arm extending out from said mount and carrying contacts in the path of the needle; said contacts included in electrical circuits having means to regulate the heat of the furnace; a scale being provided for the needle and contacts, and means being provided to effect relative displacement between the needle and one of the contacts, to enable the needle to pass the contact.

72. A furnace-regulating device including a galvanometer needle operated by the heat of the furnace, an electrical circuit closable by the galvanometer needle, a main electrical circuit closable by the first circuit, and an air-operated valve controlling means to supply fuel to the furnace; means being included in the main circuit to control the movements of said valve; said controlling means including an air relief valve operable by the magnet included in said main circuit.

73. A furnace-regulating apparatus comprising normally open main electrical circuits, each including an electro-magnet, an armature between said magnets, means being provided to enable said armature to close either circuit, a relief valve reciprocatable by said armature after the latter closes either circuit, normally open shunt-circuits connected to the main circuits around said armature, a circuit-closer for the shunt circuits carried by the needle of a galvanometer operated by the heat of the furnace, and a second valve controlled by said relief valve and having means to control the supply of fuel to the furnace.

74. The combination of open main electrical circuits having a source of power, adjacent magnets one in each circuit, an armature mounted between said magnets and included in both of said circuits, an open shunt circuit around said armature in each of said main circuits, means for enabling fluctuations in the heat of a furnace to close said shunt circuits alternately, means for enabling the armature to close the main circuits alternately, means for enabling the armature, after closing either main circuit, to operate a relief valve, and a second air operated valve controlled by said relief valve and having means to control the supply of fuel to the furnace.

75. The combination with a furnace, of a galvanometer operated by the heat of the furnace and including a movable finger, normally open leading electrical circuits closable alternately by said finger, normally open main circuits having a source of power and each including a magnet, an arm having contacts one in each of said main circuits, and an armature included in said main circuits and constructed to move into engagement with the arm contacts to close the main circuits alternately and reciprocate said arm, said leading circuits being in the form of shunts around said armature, a relief valve operable by said armature, and an air operated valve controlled by said relief valve and having means to control the supply of fuel to the furnace.

76. The combination with a furnace, of an element therein, a galvanometer connected to said element and including an index or part movable by the current, an electrical circuit mounted independently of but controlled by said movable part, a second or main electrical circuit controlled by the first electrical circuit, a valve having means to control the supply of fuel to the furnace, a diaphragm for operating said valve, and a relief valve operated by said main electrical circuit when closed by the first current for controlling the movement of said diaphragm.

77. A furnace-regulating apparatus comprising a galvanometer needle movable by the heat of the furnace, a bridge swiveled upon said needle, and an electrical device having means to regulate the heat of the furnace and including means to present a pair of circuit-closing contacts to the bridge upon both the advancing and receding movements of the needle, without interfering with continued advance or recession of the needle in the same direction, so that the needle is left free for additional advance or recession immediately upon closing the circuit; said circuit-closing contacts being mounted upon a rotatable shaft whose movements are effected by said electrical device upon the closing of the circuit, a valve having means to control the supply of fuel to the furnace, a diaphragm connected to said valve, a relief valve to control the movements of said diaphragm, and a connection between said rotatable shaft and said relief valve.

78. A furnace-regulating apparatus comprising a galvanometer needle movable by the heat of the furnace, an open electrical circuit having a contact in the path of said needle, whereby the latter may close the circuit, and self-moving means controlled by said circuit for moving said contact out of the path of the needle, a relief valve connected to said self-moving means, and an air operated valve controlled by said relief valve and having means to control the supply of fuel to the furnace.

79. A furnace-regulating apparatus comprising a galvanometer needle movable by the heat of the furnace, an electrical device having circuit-closing contacts engageable in alternation by the needle during opposite movements thereof, self-moving means called into action by the closing of the circuit, for moving the live contact out of the path of the needle, and the other contact into the path thereof, a relief valve connected to said self-moving means, and an air-operated valve controlled by said relief valve and having means to control the supply of fuel to the furnace.

80. In a furnace-regulating apparatus, the combination with a galvanometer having a needle or movable part controlled by the heat of the furnace, of a device in the path of said needle, and means for enabling a mere touch of the needle against said device to cause the latter to move out of the needle's path, a relief valve connected to said device, a diaphragm controlled by said relief valve, and a valve connected to said diaphragm and having means to control the supply of fuel to the furnace.

81. In a furnace-regulating apparatus, the combination with a galvanometer having a needle or movable part controlled by the heat of the furnace, of two devices movable alternately into the path of said needle, and means for enabling a mere touch of the needle against either device to cause the latter to move out of and the other device to move into the needle's path, and also to cause the heat of the furnace to alter in a manner to cause a movement of the needle to the last-mentioned device, whereby the heat of the furnace is maintained approximately uniform; said heat-altering means including a relief valve operable in alternate directions by said devices, and a valve controlled by said relief valve and having means to control the supply of fuel to the furnace.

82. The combination of a furnace, a shiftable furnace-regulating device, an element in said furnace, a galvanometer connected to said element, an electrical circuit having a part in the path of the needle of the galvanometer to enable said circuit to be closed by a mere touch between said needle and said part, means being provided to permit said needle to move past said part after closing said circuit, said circuit also including a part movable by a feeble current passing through the circuit, and relatively powerful means called into action by said movable part to shift said furnace regulating device; the needle of the galvanometer being independent of any electric circuit.

83. The combination with a furnace, of an electrical device connected thereto and including an index or part movable by a weak current produced by the heat of the furnace, an electrical leading circuit, means for enabling said movable part by exerting a weak pressure to close said leading circuit, means being provided for permitting the index to continue its movement in the same direction after closing said leading circuit, and means for enabling a feeble current flowing through said leading circuit to cause a strong current to flow through a main electrical circuit, a device being included in the main circuit and shiftable by the current in said main circuit, to regulate the heat of the furnace; said index being independent of any electric circuit.

84. The combination with a furnace and shiftable means to regulate the heat thereof, included in a main electrical circuit requiring a strong current to shift the heat-regulating means, of an electrical device through which a weak current is caused to flow by the heat of the furnace and including an index or part which is moved by the current from initial position to an extent determined by the strength or volume of the current, and an electrical leading circuit normally open but closable by a feeble touch or pressure of said index or movable part sufficiently to permit a feeble current to pass through said leading circuit, means being provided for permitting the index to continue its movement in the same direction after closing said leading circuit, and means for enabling such feeble current passing through said leading circuit to cause to flow through the main circuit a current sufficiently strong to shift said heat-regulating means; said index being independent of any electric circuit.

85. The combination of an open electrical circuit including a regulating device shiftable by the current in the circuit, a galvanometer controlled by an element in the furnace, and including a movable finger, and an electrical leading circuit having a contact whereby the circuit is closable by a mere touch of the finger and caused thereby to close the first circuit; means being provided for effecting relative displacement between the finger and the contact, to permit said finger to continue its movement in the same direction after closing said leading circuit; the needle of the galvanometer being independent of any electric circuit.

86. The combination of a furnace, a shiftable furnace-regulating device, an element in said furnace, a galvanometer connected to said element, an electrical circuit having a part in the path of the needle of the galvanometer to enable said circuit to be closed by a mere touch between said needle and said part, means being provided to permit said needle to move past said part after closing said circuit, said circuit also including a part movable by a feeble current passing through the circuit, and relatively powerful means called into action by said movable part to shift said furnace regulating device; said needle being independent of any electric circuit.

87. The combination with a furnace, of an electrical device connected thereto and including an index or part movable by a weak current produced by the heat of the furnace, an electrical leading circuit, means including a contact, for enabling said movable part by exerting a weak pressure to close said leading circuit, means being provided for permitting the index to continue its movement independently of said contact in the same direction after closing said leading circuit, and means for enabling a feeble current flowing through said leading circuit to cause a strong current to flow through a main electrical circuit, a device being included in the main circuit and shiftable by the current in said main circuit, to regulate the heat of the furnace; said index being independent of any electric circuit.

88. The combination with a furnace and shiftable means to regulate the heat thereof, included in a main electrical circuit requiring a strong current to shift the heat-regulating means, of an electrical device through which a weak current is caused to flow by the heat of the furnace and including an index or part which is moved by the current from initial position to an extent determined by the strength or volume of the current, and an electrical leading circuit having a contact and normally open but closable by a feeble touch or pressure of said index or movable part sufficiently to permit a feeble current to pass through said leading circuit, means being provided for permitting the index to continue its movement in the same direction independently of said contact after closing said leading circuit, and means for enabling such feeble current passing through said leading circuit to cause to flow through the main circuit a current sufficiently strong to shift said heat-regulating means; said index being independent of any electric circuit.

89. The combination of a furnace, a galvanometer operated by the furnace and including a part movable by the current, a device in the path of said movable part and operable thereby and connected to means to diminish the heat of the furnace, and a second device in the path of said movable part and operable by an opposite movement of the latter and connected to means to increase the heat of the furnace; said devices connected for simultaneous manual adjustment to determine the heat at which the furnace shall be maintained; and said galvanometer comprising means for causing said movable part to pass said second device upon the initial movement of the movable part.

90. In a furnace-regulating apparatus, the combination with a needle or moving part of a galvanometer or the like, of an electrical device for regulating the heat of the furnace, and including an open circuit having a circuit-closing contact in the path of the needle, and means called into action by the closing of the circuit to move said contact out of the reach of said needle; means being provided to complete such movement of the contact after the breaking of the circuit due to the separation of the contact from the needle; said needle being independent of any electric circuit.

91. In a furnace-regulating apparatus, the combination with a needle or moving part of a galvanometer or the like, of an electrical device for regulating the heat of the furnace and including an electrical circuit and circuit-closing contacts movable alternately into the path of the needle and engageable alternately by the needle by reason of fluctuations of the latter, and means called into action by reason of the arrest of the needle by either contact, to move such contact out of the path of the needle and the other contact into the path of the needle; means being provided to complete such movement of the contacts after the breaking of the circuit due to the separation of the contact from the needle; said needle being independent of any electric circuit.

92. A regulating apparatus comprising a furnace, a galvanometer needle, and an electrical device controlling regulating means, and including circuit-closing contacts engageable by the needle alternately upon successive fluctuations thereof; means being controlled by the circuit for effecting forcible disengagement of the needle from either contact; said contacts being carried upon a mount which is adjustable to set the contacts at different points along the path of the needle, and a scale being provided for the needle and contacts; said needle being independent of any electric circuit.

93. The combination of a furnace, a galvanometer needle movable by the heat of the furnace, and an electrical device to regulate the heat of the furnace and including a circuit-closing bridge movable by said galvanometer needle, an open electrical leading circuit having a pair of contacts in the path of the bridge, whereby the circuit may be closed, a normally open electrical main circuit closable by said leading circuit, and having means to move said contacts away from the bridge, and a mount or support on which said contacts are mounted, whereby they may be set to different points in the path of the needle; said needle being independent of any electric circuit.

94. A furnace-regulating apparatus including a furnace, a galvanometer or voltmeter comprising a needle pivoted within a casing and operated by the heat of the furnace, a table or mount rotatably mounted on the casing and independently of the needle pivot, and an arm extending out from said mount and carrying contacts in the path of the needle; said contacts included in electrical circuits having means to regulate the heat of the furnace, and means being provided to enable the needle to move past one of said contacts; said needle being independent of any electric circuit.

95. A furnace-regulating apparatus including a furnace, a galvanometer or voltmeter comprising a needle pivoted within a casing and operated by the heat of the furnace, a table or mount rotatably mounted on the casing and independently of the needle pivot, and an arm extending out from said mount and carrying contacts in the path of the needle; said contact included in electrical circuits having means to regulate the heat of the furnace; a scale being provided for the needle and contacts; and means being provided to enable the needle to move past one of said contacts; said needle being independent of any electric circuit.

GEORGE F. MACHLET, Jr.

Witnesses:
SAMUEL R. OGDEN,
A. MACHLET.